Figure 29:
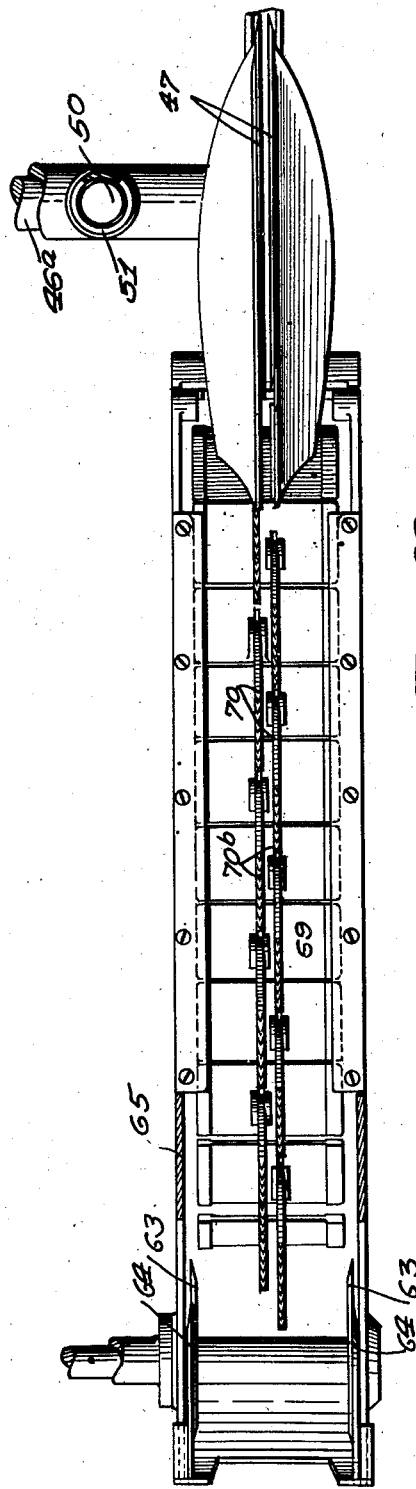

Feb. 28, 1939. W. H. HUNT 2,149,021
MEANS AND METHOD OF FILLETING FISH
Filed Nov. 26, 1934 11 Sheets-Sheet 1
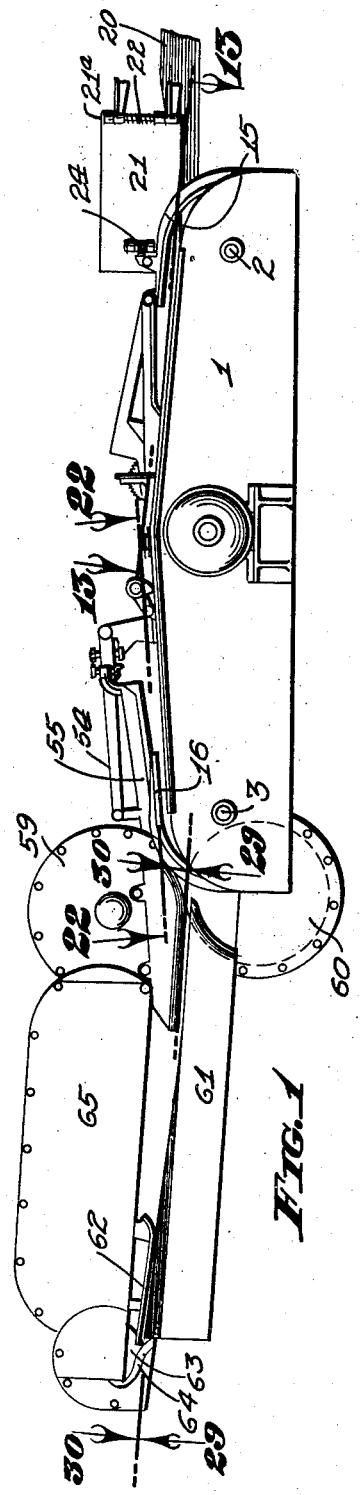
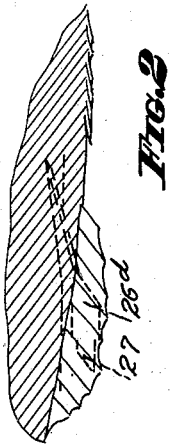
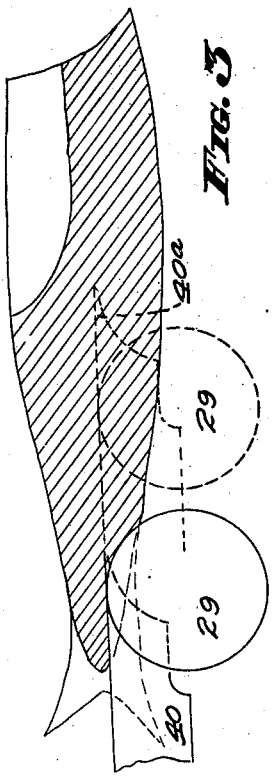
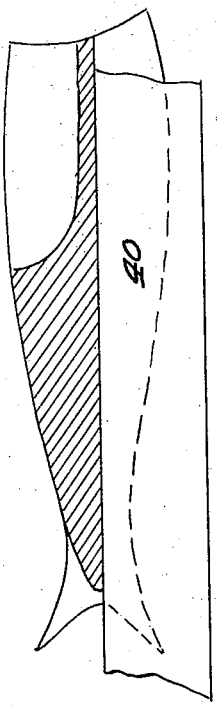
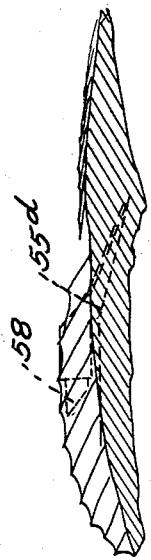
INVENTOR
WILLIAM H. HUNT
BY A. B. Bowman
ATTORNEY

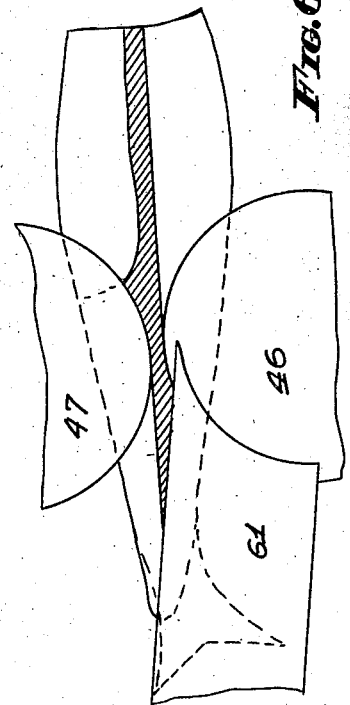
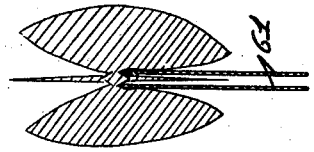
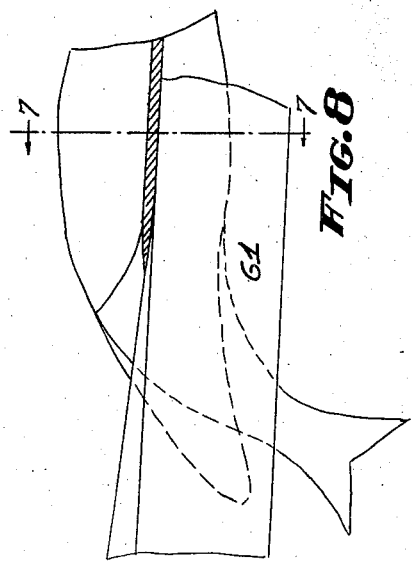
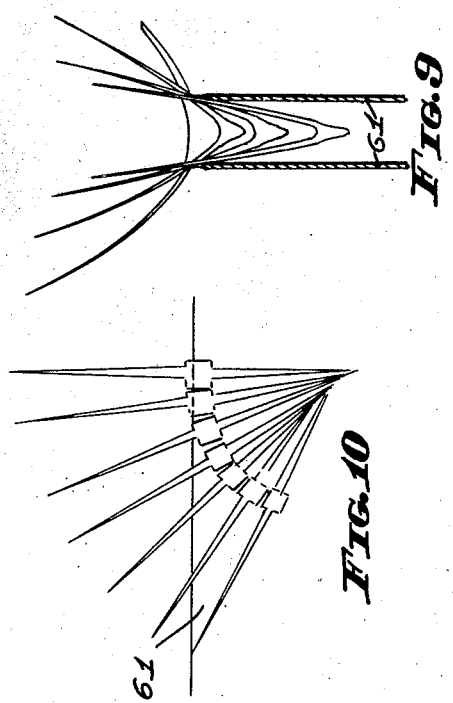
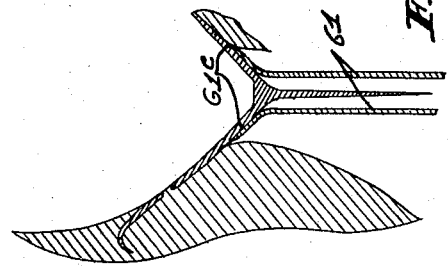
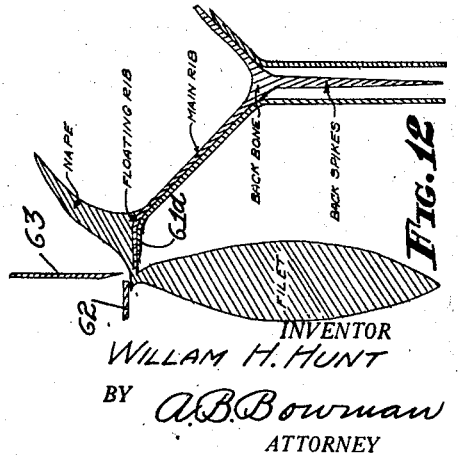

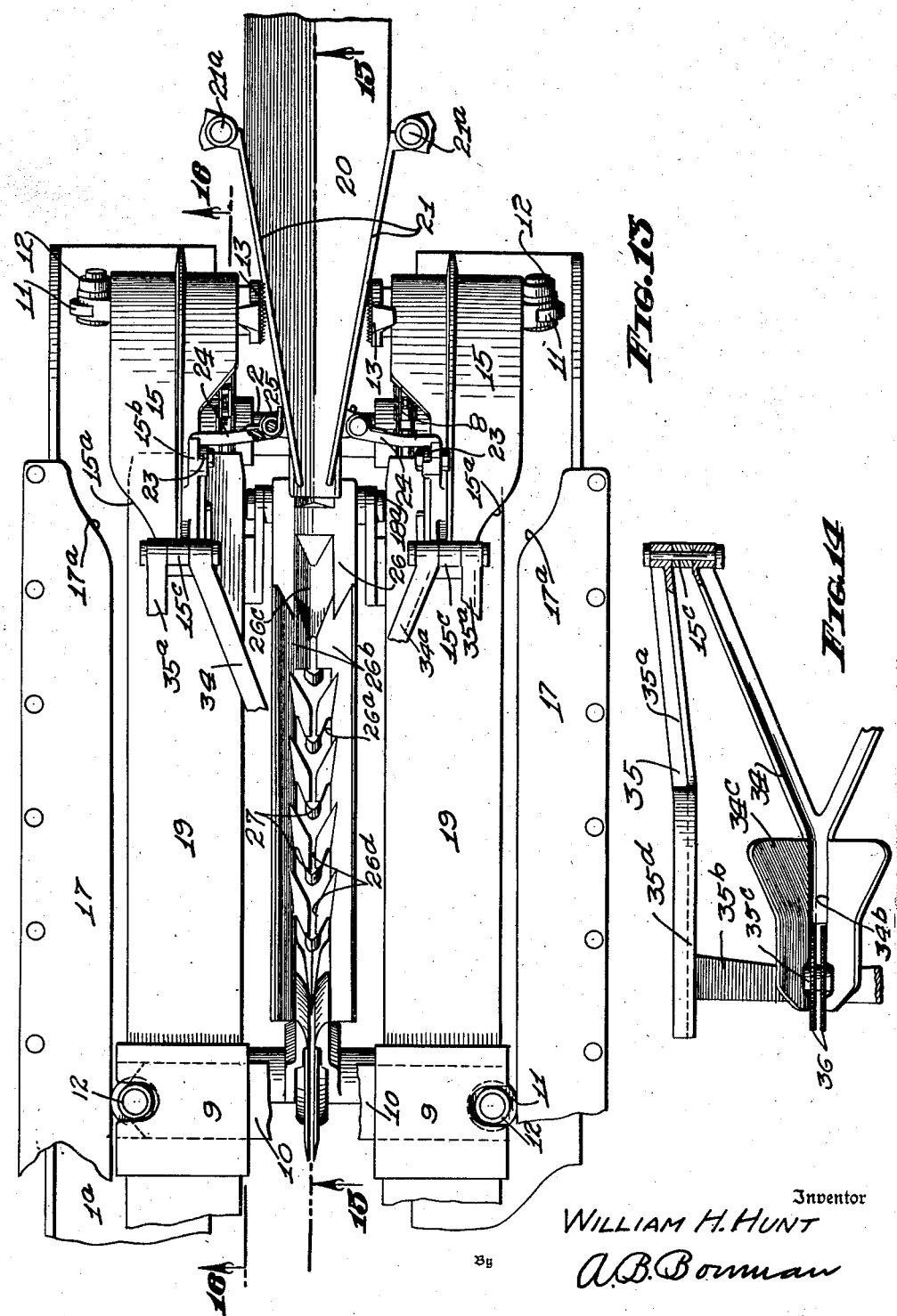

Feb. 28, 1939.    W. H. HUNT    2,149,021
MEANS AND METHOD OF FILLETING FISH
Filed Nov. 26, 1934    11 Sheets-Sheet 4
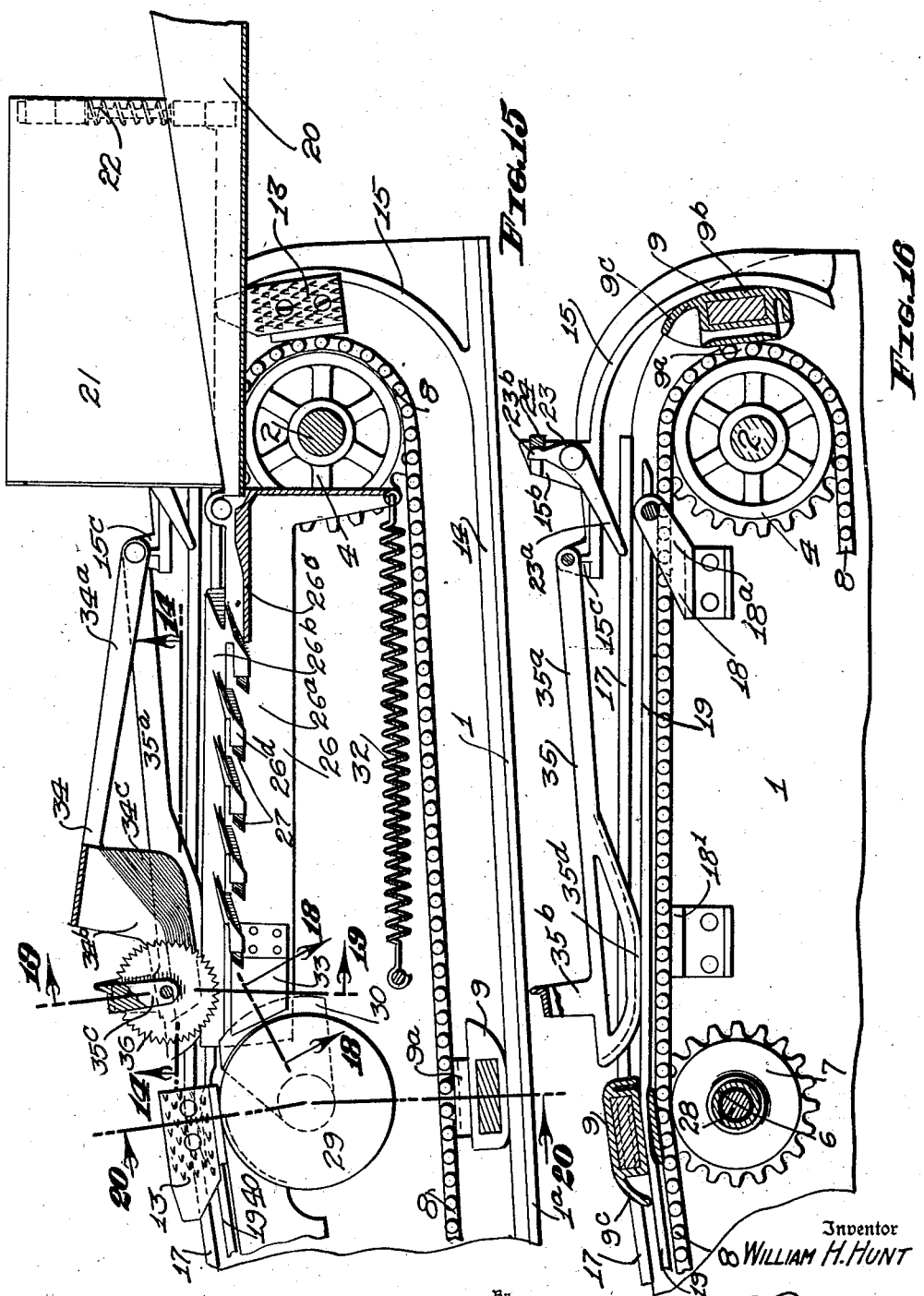
Inventor
WILLIAM H. HUNT
By
A. B. Bornman
Attorney

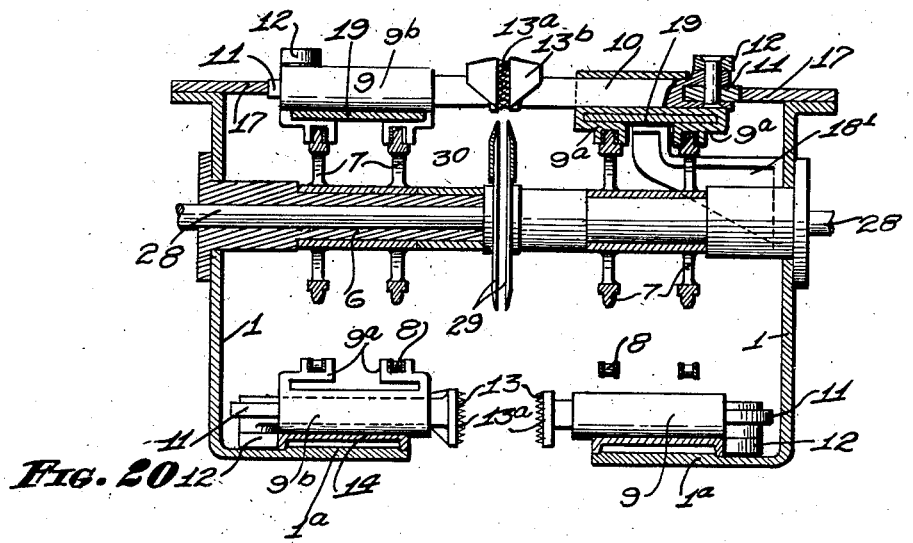
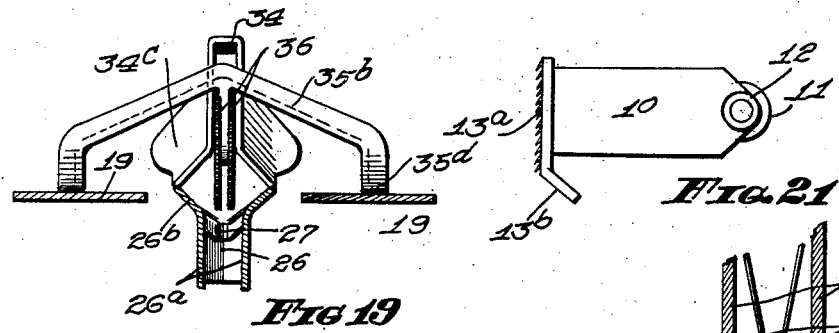
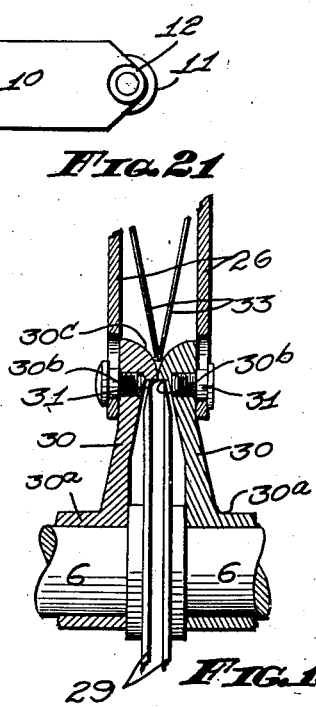
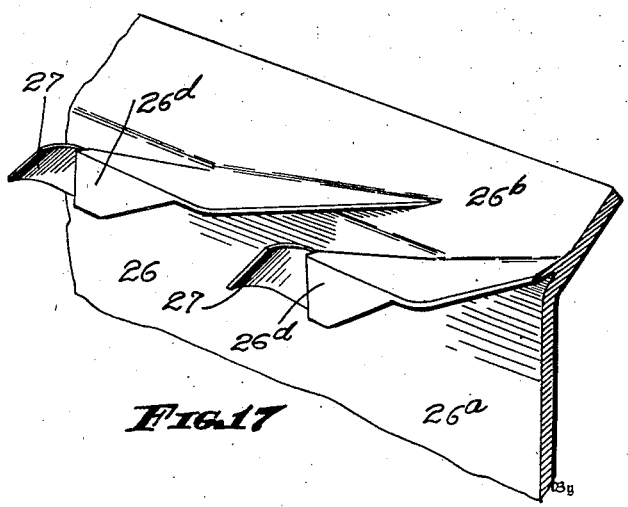

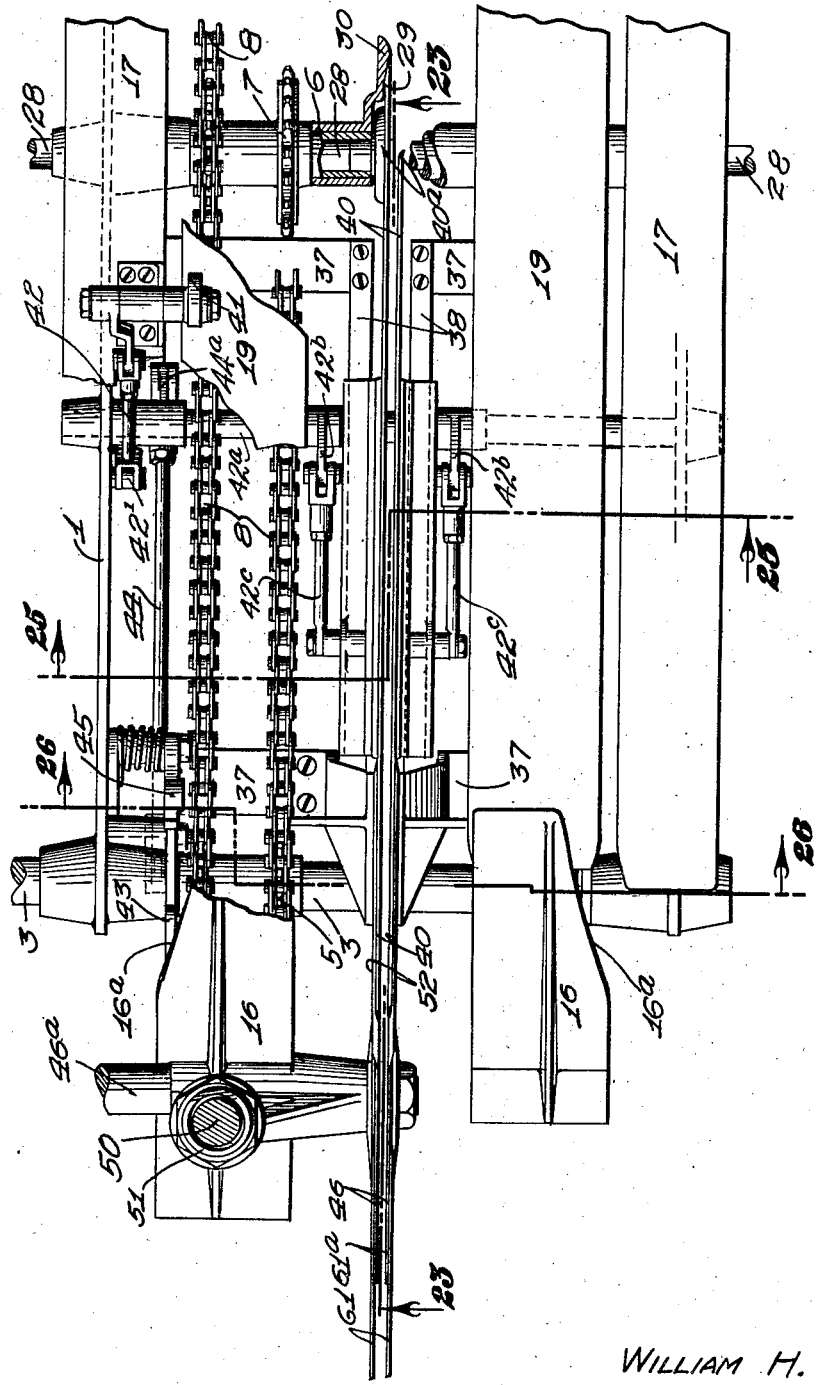

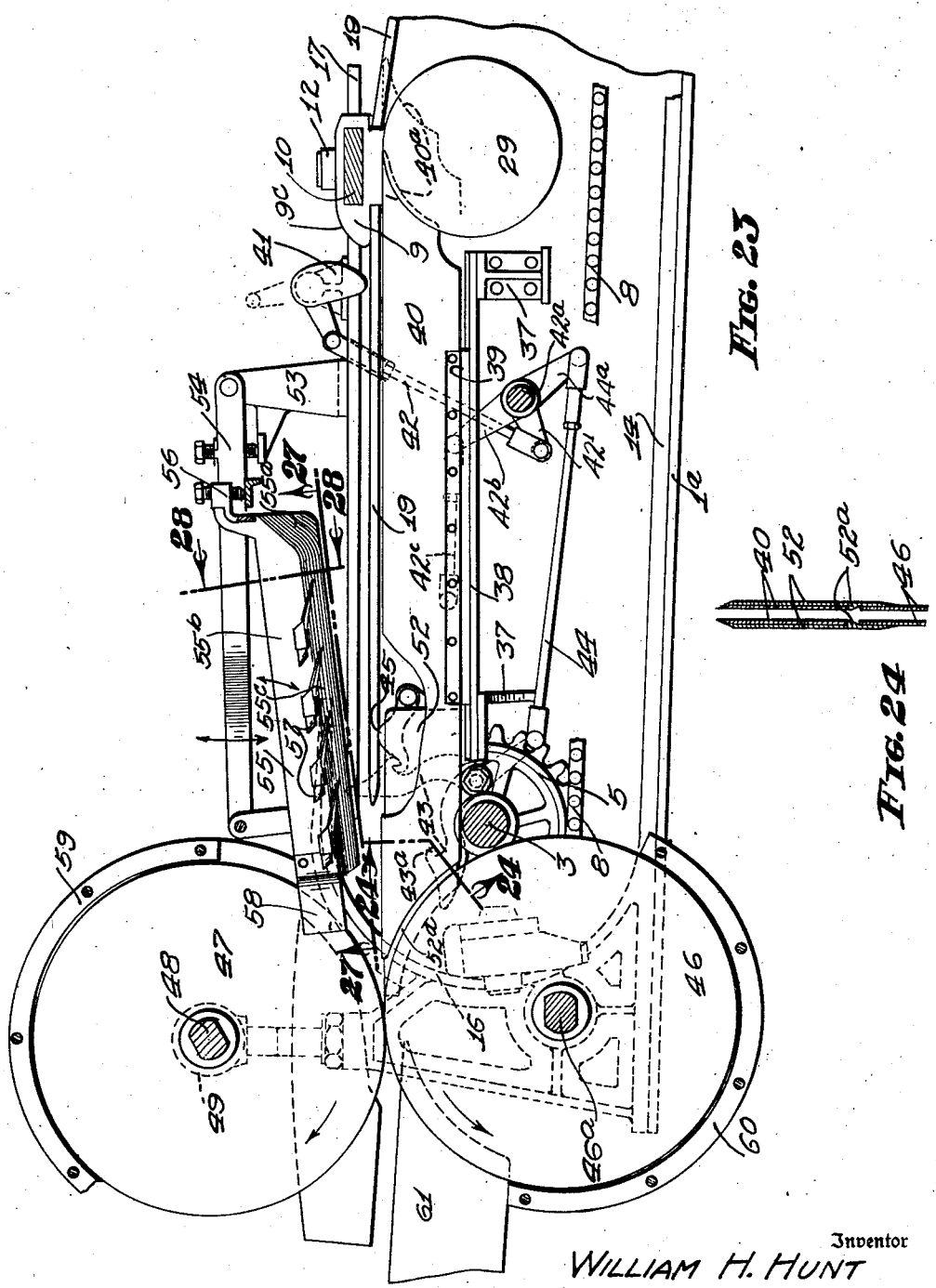

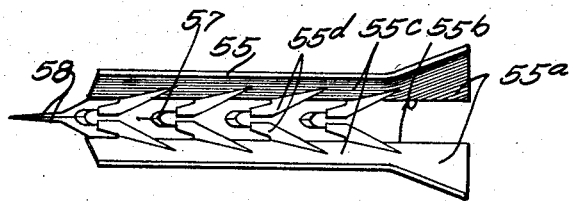
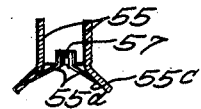
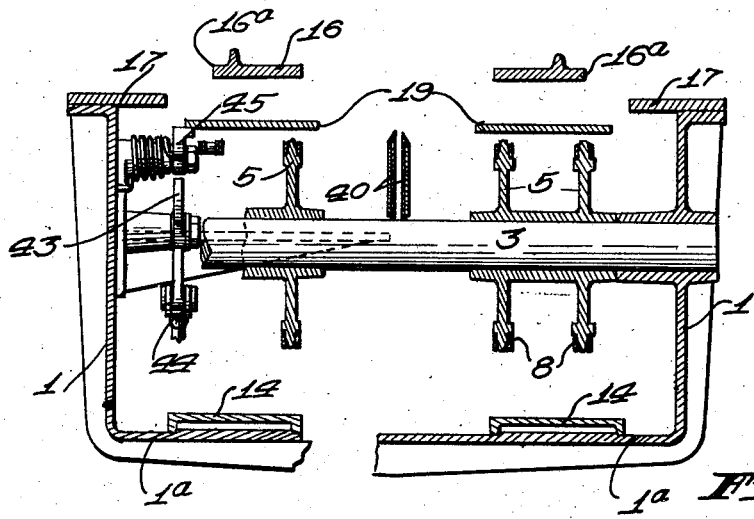

Feb. 28, 1939.   W. H. HUNT   2,149,021
MEANS AND METHOD OF FILLETING FISH
Filed Nov. 26, 1934   11 Sheets-Sheet 9

Inventor
WILLIAM H. HUNT
A. B. Bowman
Attorney

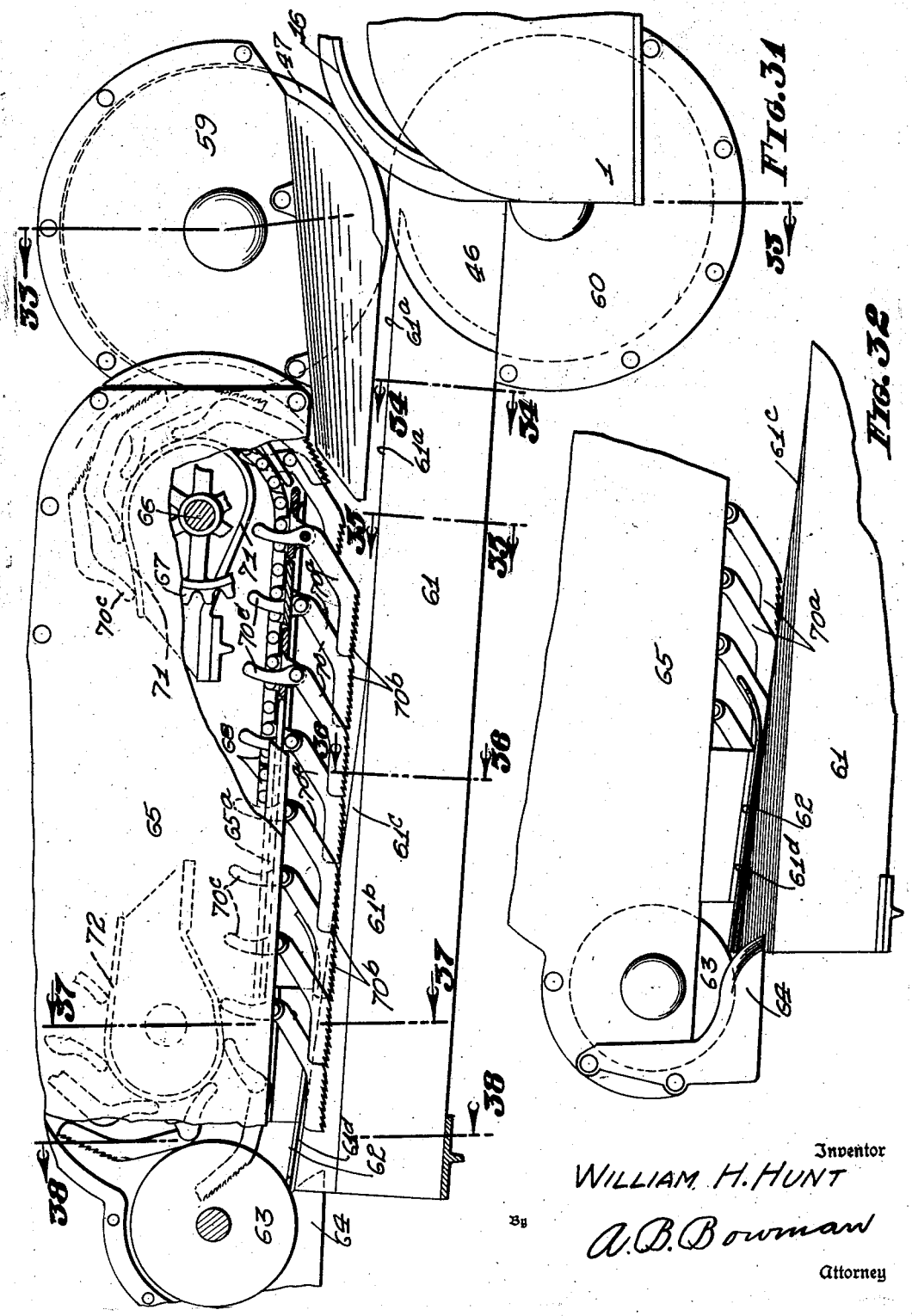

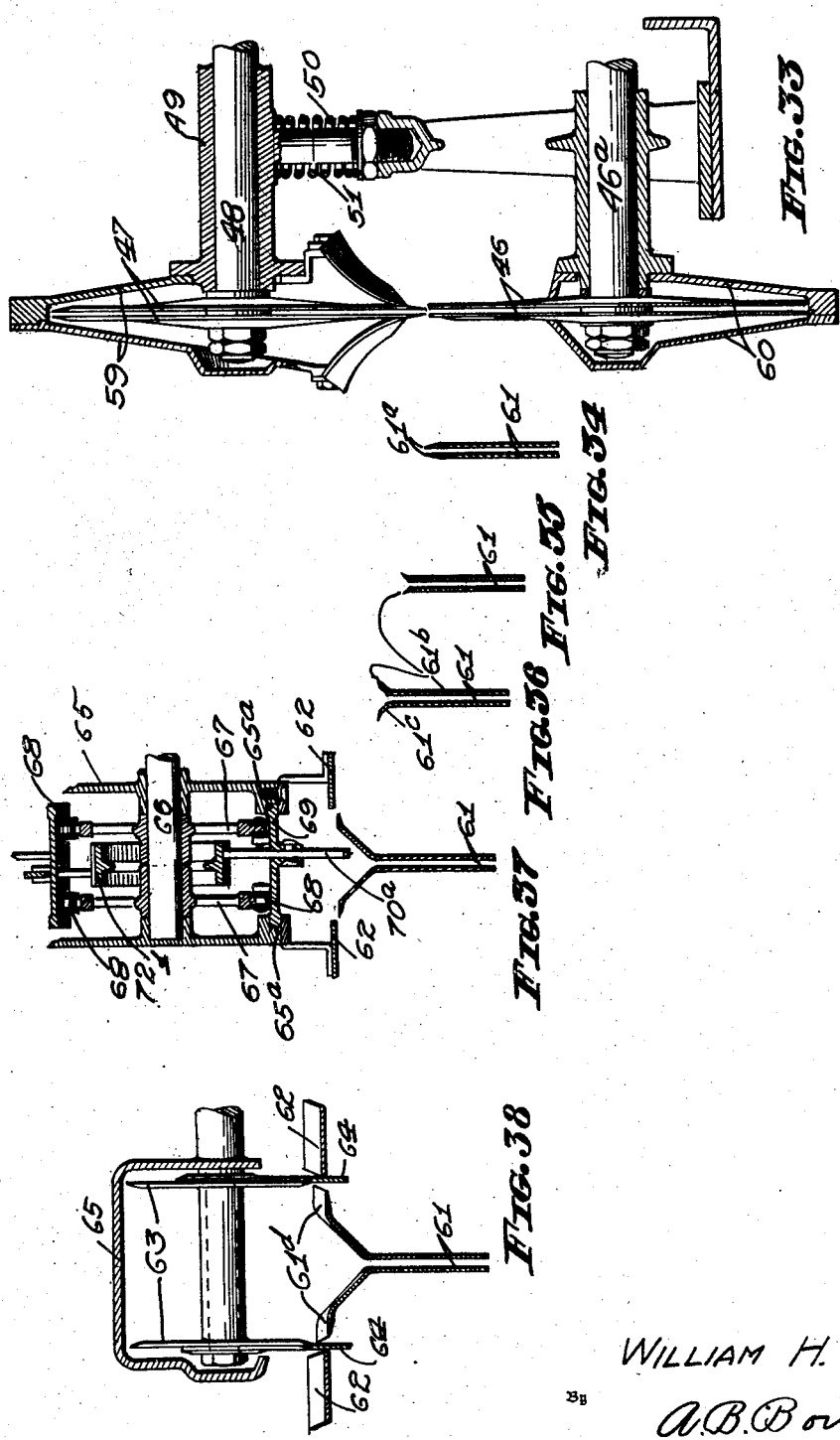

Patented Feb. 28, 1939

2,149,021

UNITED STATES PATENT OFFICE

2,149,021

MEANS AND METHOD OF FILLETING FISH

William H. Hunt, National City, Calif., assignor to Fish Machinery Corporation, San Diego, Calif., a corporation of California Application November 26, 1934, Serial No. 754,727

65 Claims. (Cl. 17—3)

My invention relates to means and method of filleting fish, and the objects of my invention are:

First, to provide a means and method of this nature which effects a particularly complete recovery of boneless meat from the fish;

Second, to provide a means and method of this nature in which the danger of bones being present in the fillets is reduced to a minimum;

Third, to provide a method of filleting fish wherein the fish is engaged and guided from the back bone thereon and the back bone is straightened should it have become warped or crooked;

Fourth, to provide a means of filleting fish which is capable of handling both straight and crooked fish without change in adjustment as well as fish of varying size within the range of the machine;

Fifth, to provide a means of filleting fish which incorporates means for scraping the fins loose from any adhesions to the sides of the fish and guiding said fins whereby they may pass between knives separated only appreciably wider than the thickness of such fins, thereby reducing to a minimum the quantity of meat that may remain adhering to the bones of the fish;

Sixth, to provide a means of filleting fish which is continuous and rapid in its operation and capable of coacting with any device arranged to deliver fish one at a time belly upward and tail first;

Seventh, to provide a means of filleting fish whereby parallel incisions are made along the sides of the back bone of the fish, thereafter similar incisions are made along the belly of the fish, thereupon the meat is scraped from the ribs of the fish;

Eighth, to provide a means of filleting fish wherein the incisions along the back and belly of the fish are made contiguous to the back bone thereof and vary with the varying diameter of the back bone;

Ninth, to provide a means and method of filleting fish which reduces to a minimum the manual handling of the fish in the process of canning or otherwise preparing the fish for the market;

Tenth, to provide a means and method of this class which incorporates in a single continuously operating machine all the functions formerly performed by a plurality of special machines;

Eleventh, to provide a machine of this class which is particularly safe in its operation the working parts being readily enclosed; and Twelfth, to provide a means of this class which is capable of continuous operation without clogging, which is particularly durable and dependable in its operation.

Figure 30:
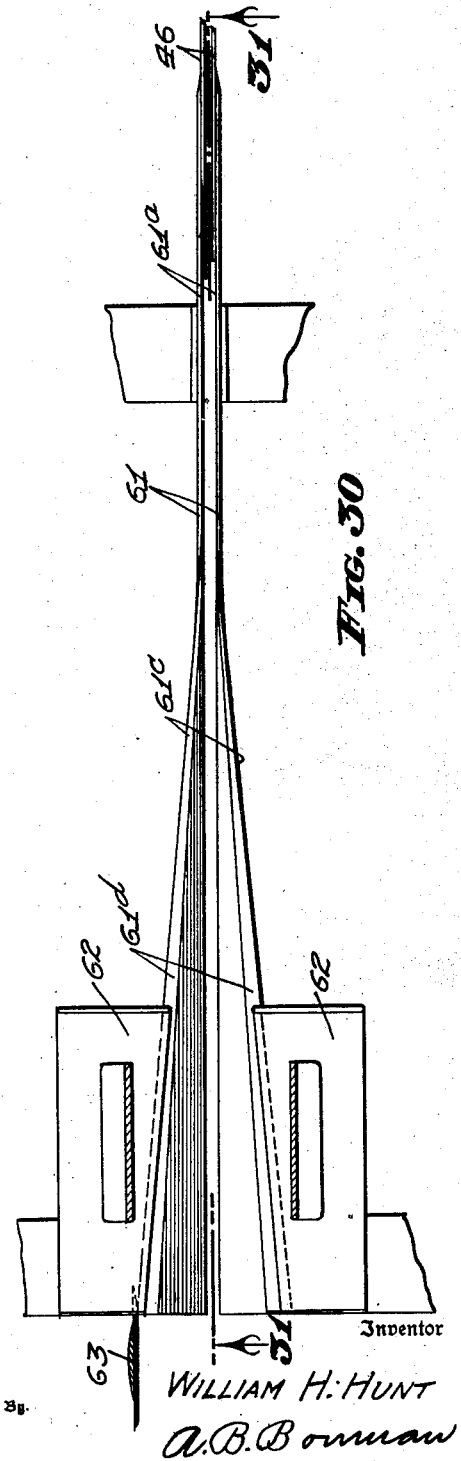

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my fish filleting means; Figs. 2 to 12, inclusive, are diagrammatical views illustrating the functions of the various parts of my means and my method of filleting fish, wherein: Fig. 2 illustrates the manner in which the back fins are spread and guided in order to pass between the back slicing knives; Fig. 3 illustrates the manner in which the guiding and rotary back slicing knives make longitudinal incisions along the back of the fish; Fig. 4 indicates the disposition of the fish on the back guiding arrangement; Fig. 5 illustrates the manner in which the belly fins are raised and straightened; Fig. 6 illustrates the operation of the belly slicing knives and the guiding and feeding wheels therebelow; Fig. 7 illustrates by means of a transverse sectional view of the fish on the line 7—7 of Fig. 8 the manner in which the fillets are completely severed from the back bone after the back and belly incisions are made; Fig. 8 illustrates the position assumed by the fish as it rides on the ribbing knives; Fig. 9 is a transverse enlarged detail view of the back bone and ribs of the fish as they appear when curved as shown in Fig. 8; Fig. 10 is a fragmentary longitudinal sectional view thereof; Fig. 11 is a transverse sectional view as they appear during the beginning of the ribbing operation, and Fig. 12 illustrates the relation of the parts upon completion of the ribbing operation; Fig. 13 is an enlarged fragmentary plan view of the receiving end of my means of filleting fish taken substantially along the line 13—13 of Fig. 1; Fig. 14 is a fragmentary bottom view of the fish retaining and guide means taken substantially along the line 14—14 of Fig. 15; Fig. 15 is a fragmentary longitudinal sectional view taken through 15—15 of Fig. 13 with parts and portions in elevation; Fig. 16 is another longitudinal sectional view thereof through 16—16 of Fig. 13 with parts and portions shown in elevation; Fig. 17 is an enlarged fragmentary perspective view of the back rib straightening element; Fig. 18 is an enlarged fragmentary sectional view taken substantially through 18—18 of Fig. 15; Fig. 19 is a fragmentary transverse sectional view taken through 19—19 of Fig. 15 illustrating the weight or tension wheels and fish guide; Fig. 20 is a transverse sectional view through 20—20 of Fig. 15 with parts and portions in elevation; Fig. 21 is a plan view of a slide bar and the rollers and fish clutching jaw; Fig. 22 is an enlarged fragmentary plan view of the intermediate portion of my means taken substantially along the line 22—22 of Fig. 1; Fig. 23 is an enlarged fragmentary longitudinal sectional view thereof taken through 23—23 of Fig. 22 with parts and portions in elevation; Fig. 24 is a fragmentary sectional view through 24—24 of Fig. 23; Fig. 25 is a transverse sectional view through 25—25 of Fig. 22; Fig. 26 is another transverse sectional view through 26—26 of Fig. 22; Fig. 27 is a bottom view of the belly fin scraping and guiding arrangement taken substantially along the line 27—27 of Fig. 23; Fig. 28 is a transverse sectional view of the belly fin scraping arrangement taken through 28—28 of Fig. 23; Fig. 29 is a bottom view of the discharging end portion of my means taken substantially along the line 29—29 of Fig. 1; Fig. 30 is a plan view thereof taken substantially along the line 30—30 of Fig. 1; Fig. 31 is a fragmentary longitudinal sectional view thereof taken substantially along the line 31—31 of Fig. 30 with parts and portions in elevation; Fig. 32 is a fragmentary elevational view illustrating the rear or discharging end of my means; Fig. 33 is a transverse sectional view taken substantially through 33—33 of Fig. 31 with parts and portions in elevation; Fig. 34 is another transverse sectional view taken substantially through 34—34 of Fig. 31; Fig. 35 is another transverse sectional view through 35—35 of Fig. 31; Fig. 36 is another transverse sectional view through 36—36 of Fig. 31; Fig. 37 is another transverse sectional view through 37—37 of Fig. 31; and Fig. 38 is another transverse sectional view through 38—38 of Fig. 31.

Similar characters of reference refer to similar parts and portions throughout the several views of the drawings.

Side frames 1, sprocket shafts 2 and 3, forward sprockets 4 and 5, idler sprocket spindles 6, idler sprockets 7, chains 8, traveler members 9, slide bars 10, rollers 11 and 12, fish clutching plates 13, tracks 14, cam tracks 15 and 16, guide strips 17, brackets 18, traveler guides 19, trough 20, gates 21, springs 22, levers 23, catch arm 24, springs 25, back fin straightener frame 26, fin spreading elements 27, shafts 28, back slicing knives 29, knife guard 30, journal pins 31, spring 32, fin guiding plates 33, retainer guard 34, framework 35, tension wheels 36, brackets 37, slide rails 38, slide bars 39, guide plates 40, guide plate shifting cam 41, link and lever means 42 and 42', lever 43, link 44, catch arm 45, guide disks 46, belly slicing knives 47, shaft 48, bearing 49, stop 50, spring 51, fixed guide plates 52, brackets 53, arms 54, belly fin straightening frame 55, stop means 56, belly fin spreading elements 57, guide ears 58, casings 59 and 60, severing and ribbing blades 61, shields 62, clipping blades 63, fixed guards 64, casing 65, shafts 66, sprocket wheels 67, chains 68, supporting plates 69, levers 70, and cams 71 and 72 constitute the principal parts and portions of my novel means and method of filleting fish.

Side frames 1 are provided which support sprocket shafts 2 and 3 at their forward or receiving ends and at their rear or discharge ends. Sets of forward and rearward sprockets 4 and 5 are mounted on the shafts 2 and 3, respectively.

Idler sprocket spindles 6 extend inwardly from the side walls of the side frames 1 intermediate the sprocket shafts 2 and 3. The spindle 6 receives idler sprockets 7. The sets of sprockets are arranged in pairs adjacent the two side frames and receive chains 8. The idler sprockets are mounted somewhat above the sprockets 4 and 5 so that the upper levels of the chains traverse relatively angular planes.

Each pair of chains supports a plurality of traveler members 9. The traveler members carried by the two sets of chains are arranged in transversely disposed pairs. Each traveler member comprises bracket portions 9a which attach to the corresponding pair of set of chains, a body portion 9b having a tranversely extending bore of rectangular section therethrough. The outer and forward side of each traveler member is beveled or rounded, as indicated by 9c. Each traveler member 9 slidably receives in its bore a slide bar 10. At the laterally outward end each slide bar 10 supports a pair of rollers 11 and 12. The laterally inward end of each slide bar receives a fish clutching plate 13. Each clutching plate 13 is provided with clutching spikes 13a. The rear end of each plate 13 is turned outwardly, as indicated by 13b.

The lower sides of the frames 1 are provided with ledges 1a which extend underneath the sets of chains and are provided with tracks 14. The laterally outward sides of the tracks 14 are adapted to be engaged by the rollers 12 to hold the clutching plates 13 in spaced relation with each other, as shown best in Fig. 20. The tracks 14 join at the forward end of the machine to upwardly and rearwardly curved cam tracks 15 which are provided at their extended or upper and forward ends with cam portions 15a to permit inward movement of the slide bars 10. A similar cam track 16 is provided at the rearward end of each track 14, said tracks 16 curving upwardly and forwardly and having at their forward or receiving extremities cam portions 16a.

Between the extremities of the cam tracks 15 and 16 and laterally outward therefrom and supported by the side frames 1 there are provided guide strips 17. The guide strips 17 are engaged by the rollers 11 and are arranged to hold the clutching plates 13 in engaging relation, as shown in the upper portion of Fig. 20. The forward or receiving ends of the guide strips 17 are provided with cam portions 17a coacting with the cam portions 15a. With this arrangement the slide bars are caused to occupy a laterally inward position while traversing the upper level of the chains and to occupy a laterally outward position while traversing the lower level thereof.

There is supported from each side frame by means of brackets 18' a pair of traveler guides 19 which are coextensive with the guide strips 17. The traveler guides 19 fit in slots formed by the bracket portions 9a of the traveler members, as shown best in Fig. 20. The traveler guides 19 and guide strips 17 are curved to form slight arching of the chains over the idler sprockets 7.

A suitable feeding trough or other feeding device 20, as shown fragmentarily in Figs. 13 and 15, is mounted with an end extending into the forward or receiving end of the machine between the cam tracks 15. The rearward or discharge end of the trough 20 is bordered by a pair of gate members 21 pivoted at their forward ends, as indicated by 21a, and converging towards their rearward ends. The gates 21 are controlled by springs 22 which tend to spread their normally converging or rearward ends. The extremity of each cam track 15 supports a bracket 15<sup>b</sup> upon which is journalled a lever 23. The levers 23 are disposed over the forward ends of the traveler guides 19 and each includes a leg 23<sup>a</sup> which normally extends forwardly and downwardly towards said guide 19 so as to be engaged by the traveler members 9 as they enter the upper level of the chain. Each lever 23 includes an arm 23<sup>b</sup> which extends upwardly and is adapted to engage a catch arm 24 hinged to a corresponding gate 21 near its discharge or rear end. Each catch arm 24 is provided with a spring 25 which holds the extended end of the catch arm in engagement with the corresponding bracket 15<sup>b</sup> so that the discharge ends of the gates are retained against outward movement. The catch arms 24 upon being engaged by the arm 23<sup>b</sup> as the traveler members enter the upper level of the chains release the gates 21. When the gates are held by the catch arms 24 the tail portion only of a fish protrudes from the discharging ends of the gates. As the traveler members come on to the upper level of the chains the cam portions 17<sup>a</sup> force the fish clutching plates 13 into engagement with the protruding tail portion of the fish and at the same time operate the levers 23 to release the catch arms, allowing the gates 21 to open and the fish to be drawn into the machine by the clutching plates. Suitable means, not shown, are provided for resetting the gates upon being tripped to their open position.

A back fin straightener frame 26 is journalled at its forward end and at the discharge end of the trough 20 by means of extensions 18<sup>a</sup> from a rearward bracket 18. Said frame 26 is provided with a longitudinally extending slot 26<sup>a</sup> therein which merges into a crosswise or upwardly converging guide wall 26<sup>b</sup>. The forward or receiving end of the frame 26 has a shelf 26<sup>c</sup> closing the slot 26<sup>a</sup>. Between the shelf 26<sup>c</sup> and a point near the forward end of the frame 26 there is arranged a plurality of laterally inwardly and forwardly directed fin deflecting bosses 26<sup>d</sup>. Each boss 26<sup>d</sup> has a downwardly and forwardly directed and converging undercut or lip portion 26<sup>e</sup> which begins at a point well up on the guide walls 26<sup>b</sup> of the frame so as to engage fins which may have been curled against the back of the fish and deflect them into centered relation with the fish, that is, into the slot 26<sup>a</sup>. The forward end of each boss 26<sup>d</sup> carries a straightener clip element 27, said elements being arranged in pairs and in the form of leaf springs with laterally inwardly turned and rearwardly and forwardly sloped extremities which tend to draw across the spines of the fins, as shown in the diagrammatical view Fig. 2, thereby spreading the fins to their minimum width so as to pass between the knives, as will be brought out hereinafter.

The idler sprocket spindles 6 are provided with bores therethrough which receive shafts 28. The shafts 28 terminate in contiguous relation with each other and each supports a back slicing knife 29 which is in the form of a circular flat disk. It is preferred to mount the shafts 28 in slight angular relation with the axis of the idler sprockets 7, the shafts 28 being disposed in slight angular relation with each other in such a manner that the peripheries of the back slicing knives are slightly closer at a point forwardly and upwardly from their axes. The shafts 28 may be driven by independent motors but in such a manner that the back slicing knives rotate in synchronism.

A knife guard 30 is journalled by its bearing portion 30<sup>a</sup> on each idler sprocket spindle 6. Each knife guard 30 includes an arcuate shoulder 30<sup>b</sup> which overhangs the periphery of the corresponding back slicing knife, and a laterally outwardly beveled portion 30<sup>c</sup> merging into the shoulder 30<sup>b</sup>, as shown best in Fig. 18. The knife guards 30 extend upwardly and forwardly with respect to the knives 29. Each knife guard 30 receives a journal pin 31 which fits in a slot in the rearward or extended end of the straightener frame 26, as shown best in Fig. 18. With this arrangement the rearward or extended end of the frame 26 is capable of shifting downwardly and causing the knife guards to be lowered therewith. A spring 32 holds the frame 26 and knife guards 30 in a predetermined upper position, as shown in Fig. 15. The rearward extremity of the straightener frame 26 carries a pair of fin guiding plates 33. Said plates are formed of thin sheet metal and fit between the knife guards 30 so that the back fins are directed between the back slicing knives 29.

The extremities of the cam tracks 15 are provided with other brackets 15<sup>c</sup> which journal the forwardly diverging arms 34<sup>a</sup> of a retainer guard 34. Said guard is in the form of a pair of parallel disposed arms 34<sup>b</sup> extending downwardly then curving in a rearward direction and practically horizontally. The arms are relatively wide and flat except for their lower margins which are turned outwardly laterally to form deflecting portions 34<sup>c</sup>, as shown best in Figs. 14, 15 and 19.

Also hinged from the brackets 15<sup>c</sup> is a framework 35 including rearwardly directed arms 35<sup>a</sup> connected by a bridge portion 35<sup>b</sup> at the rearward ends from which depends a bearing bracket 35<sup>c</sup> disposed in centered relation above the rearward extremity of the frame 26. Said bearing bracket 35<sup>c</sup> journals on opposite sides a pair of idler or tension wheels 36 having serrated peripheries. The tension wheels 36 and retainer guard 34 act to hold the fish against the back slicing knives 29 and cause the frame 26 to tilt downwardly as the section of the fish increases in height. The framework 35 includes cam portions 35<sup>d</sup> which normally rest upon the traveler guides 19 and are engaged by the traveler members as they pass thereunder, thus delaying the action of the tension wheels until the more substantial parts of the fish are thereunder.

Between the back slicing knives 29 and the rearward sprockets 5 the side frames 1 support sets of brackets 37 which extend between the upper and lower levels of the chains and in turn support a pair of slide rails 38. The slide rails are arranged adjacent each other and each receives a slide bar 39 which in turn supports a guide plate 40. The guide plates 40 are elongated and disposed in close proximity to each other so as to fit adjacent but on the outer sides of the slicing knives 29. The forward extremities of the guide plates 40 are pointed and their under sides are curved to form piercing knife portions 40<sup>a</sup>. The pointed ends of the piercing knife portions have rudimentary outturned extremities. The guide plates 40 are adapted to shift longitudinally with respect to the frame 1 and are so arranged that when in their forward position the piercing knife portions 40<sup>a</sup> extend forwardly of the back slicing knives 29 in such a manner as to engage the back bone of the fish and ride therealong, whereby the back extensions of the vertebrae are guided accurately between the slicing knives 29. The guide plates 40 and piercing knives 40ª are moved backwardly and forwardly by action of the traveler members 9 in such a manner that the tail of the fish is first initially sliced by the knives 29, whereupon the piercing knives are forced forwardly to the dotted line position shown in Fig. 23. The above movement is accomplished by means of a cam 41 engaged by a traveler member 9 so as to actuate a link 42 connected to arm 42' secured to shaft 42ª. A pair of arms 42ᵇ on shaft 42ª are connected by links 42ᶜ to the guide plates, and the cam 41 is positioned so as to be engaged by a traveler member 9 immediately after the traveler member, and consequently the tail portion of the fish, have passed the slicing knives 29; so that immediately thereafter the guide plates are moved forwardly. The guide plates are returned to the solid line position shown in Fig. 23 by means of a lever 43 engaged by the under sides of the traveler members as they pass around the cam track 16. The lever 43 is connected by a link 44 to the arms 44ª on shaft 42ª in such a manner that the rear movement of the traveler members 9 during engagement with the lever 43 causes a corresponding rearward movement of the guide plates 40. The lever 43 is provided with a catch portion 43ª which is engageable with a catch arm 45 positioned so as to be engaged by a traveler member 9 immediately before the lever 43 is engaged so as to release said lever from the catch arm prior to accomplishing a rearward shifting of the guide plates. Thus the guide plates are held in their forward or dotted line position shown in Fig. 23 until the lever 43 is released from the catch arm 45 and shifted with the movement of the traveler members 9.

Supported in any suitable rigid relation with the frames 1 and in such a manner that the traveler members 9 pass on opposite sides thereof is a pair of guide disks 46. Said disks are provided with relatively thin but unsharpened edges and are arranged in adjacent parallel spaced relation with each other. Said disks are mounted on a common shaft 46ª.

A pair of belly slicing knives 47 of circular form are mounted on a single shaft 48 above the guide disks 46 and in vertical alinement therewith. The shaft 48 is encased in a suitable bearing 49 and is capable of vertical movement. Such vertical movement is limited by a stop means 50 so that the peripheries of the belly slicing knives 47 are prevented from contacting the edges of the guide disks 46, as shown best in Fig. 33. The stop 50 incorporates a spring 51 which engages the under side of the bearing 49 to compensate for the weight of the knives 47 and mechanism supported therewith. The shafts 48 and 46ª are driven at identical speed or at such relative speeds that the peripheries of the belly slicing knives 47 and guide disks 46 are equal, by any suitable means not shown.

The guide plates 40 are adapted when in their rearward positions to conform to and be in proximity with the upper portions of the guide disks 46, as shown by solid lines in Figs. 23 and in the sectional view Fig. 24. To aid in transferring the back fins and back spikes of the fish into or between the guide disks 46, fixed guide plates 52 of thin sheet metal fit snugly against the outer sides of the guide disks 46 and the outer sides of the guide plates 40. Continuous to the guide disks 46 the fixed guide plates 52 are provided with rudimentary arcuate shoulders 52ª, as shown in Fig. 24.

The side frames 1 or guide strips 17 support a pair of brackets 53 which carry a pair of rearwardly converging arms 54 terminating near the belly slicing knives 47. At their extermities the arms 54 journal the rear end portion of a belly fin straightening frame 55. The straightening frame 55 is provided with a flared forward or extended end portion 55ª which is held at the desired height by a stop means 56. Between the flared end 55ª and the rearward or supported end of the straightening frame 55 said frame is provided with a thin receiving slot 55ᵇ and its lower margin is provided with laterally outwardly converging guide wall 55ᶜ. Arranged along the slotted portion 55ᵇ is a series of belly fin scraping or deflecting bosses 55ᵈ having undercut and relatively sharp forward and under edges similar to the construction of the deflecting bosses 26ᵈ of the back fin straightener frame. And also similar to the frame 26, the bosses 55ᵈ are provided at their extermities with fin spreading elements 57. At the rearward or discharge end of the frame 55 there is supported from opposite sides of the slot 55ᵇ a pair of guide ears 58 which are formed of thin sheet metal and extend between the belly slicing knives 47.

In addition to the guide ears 58, fixed guide plates 52, and shiftable guide plates 40, fish final positioning means may be utilized to enable the bones of the fish to pass between the belly slicing knives and guide disks, such a fish final positioning means being illustrated in my Patent No. 1,981,552, dated November 20, 1934.

The belly slicing knives 47 are mounted in a suitable casing 59, while the guide disks may be mounted in a suitable casing 60. In each case the operating portions of the knives or guide disks are uncovered.

Arranged with their forward extremities fitting over the upper rearward portions of the guide disks is a pair of severing and ribbing blades 61 which are arranged in adjacent parallel disposed relation with each other to define a slit between which fits the back bone of the fish. The forward portion of the blades form severing knife portions 61ª and are merely flat with sharpened upper edges. These knife portions sever flesh from the sides of the back bone and connect the back and belly incision or slices so that the fillet is free from the bones of the fish except for its connection to the ribs thereof. Rearwardly of the severing portions 61ª the blades 61 form rib scraping knife portions 61ᵇ which are in the form of sharpened edges arranged along the upper edges of the blades 61. Along this portion of the blades 61 their upper margins diverge upwardly, as indicated by 61ᶜ. Further rearwardly the blades turn horizontally outwardly, forming shelflike portions 61ᵈ which are likewise sharpened along their edges. Spaced outwardly and beginning at their forward ends somewhat above the shelflike portions 61ᵈ of the blades 61 is a pair of retainer shields 62 which hold the fillets down, and thereby retain the extremities of the ribs in proper relation with the edges of the blades. At the rearward extremity of the blades 61 is a pair of clipping blades 63 which are circular in form and revoluble. Below said blades 63 are mounted fixed guards 64. The clipping blades 63 and their guards 64 act to sever any remaining connection that may exist between the fillets and the central or bony part of the fish, as indicated in Fig. 12.

Supported above the blades 61 is a casing 65. A pair of shafts 66 are supported by the forward and rear ends, respectively, of the casing. Each of said shafts carries a pair of sprocket wheels 67. Chain 68 pass around the sprocket wheels. Secured at intervals to the chains 68 is a series of supporting plates 69. Said supporting plates are guided as they pass along the lower level of the chains 68 by means of guide channels 65ᵃ provided along the lower margins of the casing 65. Each supporting plate 69 journals a lever 70. Each lever 70 comprises an arm 70ᵃ which when carried along the lower level of the chains 68 faces downwardly and rearwardly terminating along its under side in a series of teeth 70ᵇ. The other or remaining arm, designated 70ᶜ, on each lever extends through the supporting plates 69 so as to project inside the area delineated by the chains 68. Between the forward sprocket wheels there is mounted a cam 71 which is shaped to engage the arm 70ᶜ of the lever 70, forcing said arms radially outwardly so that the arms 70ᵃ are held in a radially retracted position and to cause said arms to descend to the lower level of the chains while occupying the desired relation with the blades 61. A similar cam 72 is arranged between the rear set of sprockets and draws the extended arms 70ᵃ to a retracted position as they pass along the upper level of the chains.

The levers 70 are arranged in staggered relation with each other and are offset laterally so that they pass down on either side of the spikes extending towards the belly of the fish from its back bone. As will be brought out hereinafter, the levers 70 bear particularly against the inside of the belly of the fish adjacent its back bone.

Operation of my means of filleting fish is as follows: The fish are fed through the gates 21, one at a time tail first and belly side up. The fish clutching plates engage the protruding tail of the fish just forwardly of the tail fins and pull the fish from the trough 20 along and over the back fin straightener frame 26, whereupon the fin spreading elements 27 draw the back fins downwardly and spread them so that they will pass readily between the back slicing knives 29.

The back slicing knives 29 make a preliminary incision through the skin of the fish. Further movement on to the knives 29 actuates the guide plates 40 so that said plates move forward and piercing knives 40ᵃ enter through the slits formed by the knives 29 and pierce the fish until the piercing knives are in engagement with the back bone. Whereupon said piercing knives tend to follow along the back bone while the continued movement of the fish causes the slicing knives to cut the skin of the fish and to complete the piercing action of the knives 40ᵃ. This action is illustrated diagrammatically in Fig. 3. As the diameter of the fish increases the straightener frame 26 tends to lower. The angular relation between the upper edges of the guide plates 49 and the straightener frame 26 is such that the axis of the back bone of the fish is approximately parallel with the upper edge of the guide plates so that piercing knives readily follow therealong.

Upon leaving the knives 29 the back of the fish is completely sliced the entire length and to the back bone. The fish thus arrives so sliced upon the guide plates 40, the bony portions of the back of the fish between the guide plates and the fillets being disposed along the outer sides thereof, as shown diagrammatically in Fig. 4. It should be noted that by reason of the fact that the piercing knives 40ᵃ engage the back bone of the fish, should the fish be warped or should the flesh have been pressed to one side or the other of the fish and therefore render the fish unsymmetrical with respect to the back bone, said piercing knives tend to re-aline the back bone so that the bony parts are caused to pass between the back slicing knives; and further that these knives may be set with a minimum distance therebetween so that the recovery is as large as possible.

As the fish passes along the guide plates 40, still being pulled by the fish clutching plates 13, the belly of the fish and the fins thereon have been through the belly fin straightening frame 55 and the fins are spread and straightened, as shown diagrammatically in Fig. 5. The belly slicing knives 47 and the guide disks 46 rotate at quite a rapid speed, considerably more rapid than the movement of the traveler members along the guide plates; therefore, the traveler members disengage the fish just before said fish enters the blades. If the fish is insufficiently caught by the blades to be drawn on through, the laterally spread ends 13ᵇ of the succeeding fish clutching plates 13 push upon the forward or head portion of the fish until the belly slicing knives 47 can draw the fish therethrough, as shown diagrammatically in Fig. 6. The act of moving the fish into the sphere of action of the belly slicing knives 47 and guide discs 46 is accomplished by the return movement of the guide plates 40. As shown in full line position in Figure 23, these guide plates have their rear ends positioned close to the belly cutting knives 47. In returning to this position they feed the tail of the fish between the knives 47 and discs 46 aided by the guide plates 52. The clutching plates 13 which engage the fish so that its tail projects rearwardly thereof release the fish so that as the plates 40 move rearwardly they continue the movement of the fish towards and into the sphere of action of the belly slicing knives 47 and the guide discs 46. At the time the clutching plates 13 release the fish its tail projects beyond the rearward ends of the plates 40 so that their movement presents the tail to the knives 47 and discs 46. Upon passing through the belly slicing knives the fillet remains attached to the back bone of the fish along its lateral sides, there being only a small shred of meat adhering. The fillets are further attached by the ribs of the fish; however, rearwardly of the belly of the fish connection with the back bone is represented diagrammatically in Fig. 7. The two shreds of meat adhering to the back bone are quickly severed by the severing portions 61ᵃ of the blades 61 so that the fillets are attached only at the ribs of the fish. The back bone being freed of the support supplied by the meat, when it is removed therefrom from the tail portion, tends to arc downwardly as it passes along the blades 61, as shown diagrammatically in Figure 8. Advantage is taken of this fact to insure scraping contact between the ribs at the belly cavity and the scraping knives 61. As is well known, the ribs at the belly cavity at the tail end approach a more perpendicular relationship with respect to the back bone than do the ribs towards the head end of the fish which tend to approach a more horizontal relationship. This is clearly illustrated in Figures 9 and 10, where the more perpendicular ribs are those at the end of the belly cavity nearest the tail, while those which gradually become more horizontal are towards the head end of the fish. The downward arching of the freed portion of the back bone tends to swing the more perpendicular ribs to a more horizontal position, bring all of the ribs substantially in alignment so that they all contact the edges of the knives 61 to insure a scraping engagement therewith. This is very important insuring a complete removal of the flesh from the ribs. This also insures that the cutting edges of the knives 61 will tend to follow along the outer faces of the ribs to the ends thereof.

The fish is shot from the belly slicing knives and guide disks with sufficient force to move into engagement with the levers 70, which levers by reason of the downward arching of the fish engage principally along the belly cavity thereof, holding the fish down upon the blades 61. It will be noted that the levers 70 enter deeper between the blades 61 as the diverging walls thereof increase in height, so that the upper edges of the diverging walls act to scrape along the ribs, as shown in Fig. 11. Most fish have a number of small floating ribs which are adjacent to and disconnected from the main ribs. The floating ribs are arched to a certain extent, but inasmuch as the skeleton of the fish is held down upon the blades the increasing height of the blades scrapes along over the outer sides of their floating ribs. This action is further enhanced by the lateral or shelf portions 61$^d$ of the blades and the retainers 62. The width of the outwardly diverging portions 61$^c$ of the blades 61 together with the shelf portions 61$^d$ is equal to or slightly greater than the corresponding length of the main ribs and floating ribs. By the time the blades 61 have ribbed the fish to the point shown in Fig. 12 the fillets are entirely separated from the fish. However, there may be a short length of skin still adhering which is severed by the knives 63.

In brief my method of filleting fish consists in making a preliminary incision along the back bone of the fish, inserting the guiding knives which enter until they engage the back bone and thereupon follow along the back bone, whereby the fish is guided further into the knives in predetermined relation to the back bone, and thereupon the back of the fish is slitted its entire length with the slit extending to the back bone. The fish is continued through the machine while guided by its back bone and the belly fins are straightened and arranged in axial alinement with the back fins. Thereupon the belly side of the fish is sliced by parallel incisions and to the back bone while being retained against the belly slicing knives by rotating guide disks which fit in the previously made incisiions. Thereupon the fillets are cut inwardly from their back side until the flesh is completely severed from the back bone proper. Whereupon the skeleton of the fish tends to arc, bending at the back end of the belly cavity, and whereupon ribbing knives by reason of the arching engage and scrape along each of the ribs in spite of their angular variation. Then the ribbing operation continues by a sliding movement along knives untill said knives have passed to or beyond the extremities of the floating ribs of the fish as measured transversely with respect to the back bone thereof, and thereupon severing any further connection between the fillets and skeleton of the fish.

Two things should be noted in particular. The first is that by reason of the engagement with the back bone in the preliminary cutting of the fish the effect of any variation in the surface of the fish due to being compressed or mashed out of shape in storage is entirely eliminated and as a result the cutting blades may be brought into extremely close relation with each other, allowing only the thickness or approximately the thickness of the bones of the fish therebetween. The second is the arrangement whereby a considerable portion of meat otherwise lost is removed from the fish at the rear portion of the belly cavity.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A method of filleting fish consisting in, making incisions in the back of a fish on opposite lateral sides of and contiguous to its vertical axis and engaging the backbone on its top side through such incisions, and then slicing the fish longitudinally and substantially in the planes of said incisions while guiding the fish by engagement with its back bone on its top side.

2. A method of filleting fish consisting in, making incisions in a fish on opposite lateral sides of and contiguous to its vertical axis and engaging the backbone through such incisions, then slicing the fish longitudinally substantially in the planes of said incisions both above and below the back bone, and then connecting the slices on each lateral side of the back bone to sever the flesh therefrom.

3. A method of filleting fish consisting in, making incisions in a fish on opposite lateral sides of and contiguous to its vertical axis and engaging the backbone through such incisions, then slicing the fish longitudinally substantially in the planes of said incisions both above and below the backbone, then connecting the slices on each lateral side of the backbone to sever the flesh therefrom, and then scraping the flesh from the outer sides of the ribs of the fish.

4. A method of filleting fish consisting in, making incisions in a fish on opposite lateral sides of and contiguous to the vertical axis and engaging the backbone through such incisions, then slicing the fish longitudinally substantially in the planes of said incisions both above and below the backbone, then connecting the slices on each lateral side of the backbone to sever the flesh therefrom, and then bending the fish vertically over the region where the ribs merge into the belly spikes of the fish and scraping from the backbone towards the extremities of the ribs along the outer sides thereof.

5. A method of filleting fish consisting in, making a pair of incisions in the back of a fish on opposite lateral sides of and contiguous to its vertical axis and engaging the backbone through such incisions, and then severing the fleshy sides of the fish from the backbone and spikes which extend therefrom by slicing substantially along the planes of said incisions.

6. A method of filleting fish consisting in, making incisions in a fish on opposite lateral sides of and contiguous to its vertical axis and engaging the backbone through such incisions, then severing the fleshy sides of the fish from the backbone and spikes which extend therefrom by slicing substantially along the planes of said incisions, and then scraping said fleshy sides of the fish from the outer sides of the ribs.

7. A method of filleting fish consisting in, making parallel adjacent incisions in a fish from its tail forwardly along its backbone, directing the bony protuberances occurring along the vertical axis of the fish into a plane located between said incisions, and slicing said fish longitudinally in substantially the planes of said incisions while guiding the same by engagement with its backbone.

8. A method of filleting fish consisting in, making parallel adjacent incisions in a fish from its tail forwardly along its backbone, directing the bony protuberances occurring along the vertical axis of the fish into a plane located between said incisions, then slicing the fish longitudinally substantially in the planes of said incisions both above and below the backbone, and then connecting the slices on each lateral side of the backbone to sever the flesh therefrom.

9. A method of filleting fish consisting in, making parallel adjacent incisions in a fish from its tail forwardly along its backbone, directing the bony protuberances occurring along the vertical axis of the fish into a plane located between said incisions, then slicing the fish longitudinally substantially in the planes of said incisions both above and below the backbone, then connecting the slices on each lateral side of the backbone to sever the flesh therefrom, and then scraping the flesh from the outer sides of the ribs of the fish.

10. A method of filleting fish consisting in, incising a fish along its back from its tail and immediately adjacent the sides of its back spikes to its backbone, and then both continuing such incisions throughout the length of the fish and thereafter cutting the fish along its belly to the backbone side in the planes of said incisions while guiding the fish by engagement with its backbone.

11. A method of filleting fish consisting in, incising a fish along its back from its tail and immediately adjacent the sides of its back spikes to its backbone, then both continuing such incisions throughout the length of the fish and thereafter cutting the fish along its belly to the backbone side in the planes of said incisions while guiding the fish by engagement with its backbone, and then uniting the incisions and cuts by severing the flesh from the lateral sides of the backbone.

12. A method of filleting fish consisting in, incising a fish along its back from its tail and immediately adjacent the sides of its back spikes to its backbone, then both continuing such incisions throughout the length of the fish and thereafter cutting the fish along its belly to the backbone side in the planes of said incisions while guiding the fish by engagement with its backbone, and then slicing the flesh entirely free of the backbone by continuing from the incisions around the backbone to the cuts and along the outer sides of the ribs to their extremities.

13. A fish filleting apparatus comprising, dual piercing means for making incisions endwise to the backbone of a fish and laterally but contiguous and parallel to the vertical axis of said fish, dual guide apparatus utilizing said incisions and engageable with the backbone of the fish for guiding and holding in a common plane those bones normally disposed in the vertical axis of the fish, and a plurality of knives disposed substantially in the planes of said incisions for fillet-slicing the fish along such planes from end to end and to the backbone while said fish is positioned by said guide apparatus.

14. A fish filleting apparatus comprising, dual piercing means for making incisions endwise to the backbone of a fish and laterally but contiguous and parallel to the vertical axis of said fish, dual guide apparatus utilizing said incisions and engageable with the backbone of the fish for guiding and holding in a common plane those bones normally disposed in the vertical axis of the fish, a plurality of knives disposed substantially in the planes of said incisions for fillet-slicing the fish along such planes from end to end and to the backbone while said fish is positioned by said guide apparatus, and severing means for joining the fillet slices made by said knives to disconnect the flesh in fillets from the backbone of the fish.

15. A fish filleting apparatus comprising, dual piercing means for making incisions endwise to the backbone of a fish and laterally but contiguous and parallel to the vertical axis of said fish, dual guide apparatus utilizing said incisions and engageable with the backbone of the fish for guiding and holding in a common plane those bones normally disposed in the vertical axis of the fish, a plurality of knives disposed substantially in the planes of said incisions for fillet-slicing the fish along such planes from end to end and to the backbone while said fish is positioned by said guide apparatus, severing means for joining the fillet slices made by said knives to disconnect the flesh in fillets from the backbone of the fish, and a ribbing mechanism continuing from said severing means and arranged to scrape the fillets from the outer sides of the ribs of the fish.

16. A fish filleting apparatus comprising, means for engaging and conveying a fish tail first, a pair of incising blades disposed substantially longitudinally with the direction of travel of the fish and parallel with its backbone on either side of the vertical axis thereof, said blades being caused to enter and engage the backbone of the fish as the fish is conveyed by said means, fish centering means continuing from said incising blades and arranged to enter the incisions made thereby to engage the backbone and retain the spikes of the fish in a vertical plane, a plurality of slicing blades disposed substantially in the planes of said incisions above and below the backbone of the fish and arranged to cut the fish to its backbone, and cutting means completing the action of said slicing blades to sever the flesh from the backbone.

17. A fish filleting apparatus comprising, a fish centering and guiding apparatus including, knife elements for opening the fish to its backbone, centering means engageable with the backbone to hold the spikes of the fish in a common plane, fin engaging devices for deflecting such fins of the fish as normally occupy its vertical plane into said common plane, and a plurality of blades for slicing said fish to its backbone parallel with and contiguous to said common plane.

18. A fish filleting apparatus comprising, a fish centering and guiding apparatus including, knife elements for opening the fish to its backbone, centering means engageable with the backbone to hold the spikes of the fish in a common plane, fin engaging devices for deflecting such fins of the fish as normally occupy its vertical plane into said common plane, a plurality of blades for slicing said fish to its backbone parallel with and contiguous to said common plane, and scraping means following the slices made by some of said blades and positioned to scrape around the backbone and along the ribs of the fish.

19. In a fish filleting machine, a fish centering and guiding apparatus including knife elements for opening the fish to its backbone, centering means engageable with the backbone to hold the spikes of the fish in a common plane, and fin engaging devices for deflecting such fins of the fish as normally occupy its vertical plane into said common plane.

20. A fish filleting apparatus comprising, a fish centering and guiding apparatus including knife elements for opening the fish to its backbone, centering means engageable with the backbone to hold the spikes of the fish in a common plane, fin engaging devices for deflecting such fins of the fish as normally occupy its vertical plane into said common plane, a first pair of rotatable blades for fillet slicing said fish along one side to its backbone parallel with and contiguous to said common plane, a pair of rotatable feeding disks arranged to follow the paths made by said first rotatable blades and continuing from said centering means, a second pair of rotatable blades opposite said feeding disks for fillet slicing said fish similarly to said first blades along the opposite side of the fish, conveyor means for receiving the fish from said feeding disks, and fixed scraping devices positioned to complete the fillet slices made by said blades as the fish is propelled by said conveyor means.

21. In a method of filleting fish consisting in making incisions in the back of the fish on opposite lateral sides of and contiguous to its vertical axis and engaging the backbone on its top side through such incisions, and then slicing the fish longitudinally and substantially in the planes of said incisions while guiding the fish by engagement with its back bone on its top side.

22. In a method of filleting fish consisting in making incisions in a fish on opposite lateral sides of and continguous to its vertical central plane and engaging the backbone through such incisions, slicing the flesh from the fish along both sides of the back and belly spikes, and scraping the flesh from the ribs of the fish while guiding the fish by engagement with its backbone.

23. In a method of filleting fish consisting in making a pair of incisions in the back of the fish on opposite lateral sides of and contiguous to its vertical axis and engaging the backbone through such incisions, and then severing the fleshy sides of the fish from the backbone and spikes which extend therefrom by slicing substantially along the planes of said incisions.

24. In a method of filleting fish consisting of making incisions in a fish near the base of its tail on opposite lateral sides of a central longitudinal plane and engaging the backbone through such incisions, cutting the fleshy sides of the fish from the back and belly sides, and scraping the flesh from the ribs of the fish while guiding the fish by engagement with its backbone.

25. In a method of filleting fish the steps of advancing a fish back down and tail first in the direction of its length, making incisions in the back of the fish near the base of its tail on opposite sides of its backbone, and slicing the fish from end to end to separate the flesh from the back spikes.

26. In a method of filleting fish the steps of advancing a fish back down and tail first in the direction of its length, making incisions in the back of the fish near the base of its tail on opposite sides of its backbone, and slicing the fish from end to end to separate the flesh from the back and belly spikes.

27. In a method of filleting fish the steps of advancing a fish back down and tail first in the direction of its length, making incisions in the back of the fish near the base of its tail on opposite sides of the backbone, engaging the backbone of the fish through said incisions, guiding the fish along a defined path by reason of that engagement, and removing the flesh from the back spikes on both sides thereof.

28. In a method of filleting fish the steps of advancing a fish back down and tail first in the direction of its length, making incisions in the back of the fish near the base of its tail on opposite sides of the backbone, engaging the backbone of the fish through said incisions, guiding the fish along a defined path by reason of that engagement, and removing the flesh from the back and belly spikes on both sides thereof.

29. In a method of filleting fish the steps of advancing a fish back down and tail first in the direction of its length, making incisions in the back of the fish near the base of its tail on opposite sides of its backbone, slicing the fish from end to end to separate the flesh from the back, and belly spikes and scraping flesh from the ribs of the fish.

30. In a method of filleting fish the steps of advancing a fish back down and tail first in the direction of its length, making incisions in the back of the fish near the base of its tail on opposite sides of the backbone, engaging the backbone of the fish through said incisions, guiding the fish along a defined path by reason of that engagement, removing the flesh from the back and belly spikes on both sides thereof, and scraping flesh from the ribs of the fish.

31. In a method of filleting a fish the steps of advancing a fish tail first longitudinally of its length, slicing the flesh of the fish in substantially parallel planes from the back spikes along the back of the fish from the tail end to the head end, and guiding the back spikes and fins in a plane intermediate the slicing planes.

32. In a method of filleting fish the steps of making incisions in a fish on opposite lateral sides of a central longitudinal plane and continguous thereto, and guiding the bony protuberances of the fish in a plane intermediate the planes of incision.

33. In a method of filleting fish the steps of making incisions in the back of a fish near the base of its tail on opposite lateral sides of a central longitudinal plane and continguous thereof, guiding the back spikes and fins of the fish in a plane intermediate the planes of incision, and slicing the fleshy sides from the fish from the tail to the head end.

34. In a method of filleting fish the steps of making incisions in the back of a fish near the base of its tail on opposite lateral sides of a central longitudinal plane and contiguous thereof, guiding the back spikes and fins of the fish in a plane intermediate the planes of incision, slicing the fleshy sides from the fish from the tail to the head end, slicing the flesh from the tail towards the head on the belly side substantially in the planes of said incisions, and guiding the belly spikes and fins in a plane intermediate the slicing planes.

35. In a method of filleting fish the steps of making incisions in the back of a fish near the base of its tail on opposite lateral sides of a central longitudinal plane and contiguous thereof, guiding the back spikes and fins of the fish in a plane intermediate the planes of incision, slicing the fleshy sides from the fish from the tail to the head end, slicing the flesh from the tail towards the head on the belly side substantially in the planes of said incisions, guiding the belly spikes and fins in a plane intermediate the slicing planes, and scraping the flesh from the ribs of the fish.

36. In a method of filleting fish the steps of pulling a fish back down and tail first in the direction of its length, making incisions in the back of the fish in the region of the base of its tail, engaging the backbone of the fish through such incisions, guiding the fish in its longitudinal movement by the engagement of its backbone, cutting the fleshy sides from the fish along its back spikes, and guiding its back spikes and fins in a plane between the cutting planes.

37. In a method of filleting fish the steps of pulling a fish back down and tail first in the direction of its length, making incisions in the back of the fish in the region of the base of its tail, engaging the backbone of the fish through such incisions, guiding the fish in its longitudinal movement by the engagement of its backbone, cutting the fleshy sides from the fish along its back spikes, guiding its back spikes and fins in a plane between the cutting planes, cutting the flesh in the sides of the belly spikes of the fish, and cutting the flesh from the sides of the backbone.

38. In a method of filleting fish the steps of pulling a fish back down and tail first in the direction of its length, making incisions in the back of the fish in the region of the base of its tail, engaging the backbone of the fish through such incisions, guiding the fish in its longitudinal movement by the engagement of its backbone, cutting the fleshy sides from the fish along its back spikes, guiding its back spikes and fins in a plane between the cutting planes, cutting the flesh in the sides of the belly spikes of the fish, cutting the flesh from the sides of the backbone, and scraping the flesh from the ribs of the fish.

39. In a method of filleting fish the steps of pulling a fish back down and tail first in the direction of its length, making incisions in the back of the fish in the region of the base of its tail, engaging the backbone of the fish through such incisions, guiding the fish in its longitudinal movement by the engagement of its backbone, cutting the fleshy sides from the fish along its back spikes, guiding its back spikes and fins in a plane between the cutting planes, cutting the flesh in the sides of the belly spikes of the fish, cutting the flesh from the sides of the backbone, scraping the flesh from the ribs of the fish, and finally severing the flesh from the skeleton.

40. In a fish filleting machine the combination comprising means for moving a fish along a defined path, means for making incisions in the back of the fish at the base of its tail, means for engaging the backbone of the fish through said incisions, and means for slicing the flesh from the sides of the backbone.

41. In a fish filleting machine the combination comprising means for moving a fish along a defined path, means for making incisions in the back of the fish at the base of its tail, means for engaging the backbone of the fish through said incisions, means for slicing the flesh from the sides of the backbone, belly slicing means, and means for advancing the fish through said belly slicing means.

42. In a fish filleting machine the combination comprising means for moving a fish along a defined path, means for making incisions in the back of the fish at the base of its tail, means for engaging the backbone of the fish through said incisions, means for slicing the flesh from the sides of the backbone, belly slicing means, means for advancing the fish through said belly slicing means, and means for scraping the flesh from the ribs of the fish.

43. In a filleting machine of the type described the combination comprising means for moving a fish in the direction of its length, means for slicing the fleshy sides from the fish at the back and belly spikes, and means for scraping the flesh from the ribs.

44. In a filleting machine of the type described the combination comprising means for moving a fish in the direction of its length, means for slicing the fleshy sides from the fish at the back and belly spikes, means for scraping the flesh from the ribs, and means engaging the backbone of the fish for guiding its movement during the slicing and scraping operations.

45. In a fish filleting machine the combination comprising means for feeding a fish in the direction of its length, means for cutting the fish along the back contiguous to and on opposite sides of a central longitudinal plane and for guiding the fish in its path of movement by engagement with its backbone, and means for scraping the flesh from the ribs of the fish.

46. In a filleting machine of the type described the combination comprising means for cutting the flesh from the back of a fish along parallel planes contiguous to and on opposite sides of its back spines, and means for guiding the back spikes and fins of the fish in a plane between said cutting planes.

47. In a filleting machine of the type described the combination comprising means for cutting the flesh from the back of a fish along parallel planes contiguous to and on opposite sides of its back spikes, means for guiding the back spikes and fins of the fish in a plane between said cutting planes, means for cutting the flesh from the belly of the fish along planes on opposite sides of the belly spikes, and means for guiding the belly spikes and fins in a plane between the belly cutting planes.

48. In a filleting machine of the type described the combination comprising means for cutting the flesh from the back of a fish along parallel planes contiguous to and on opposite sides of its back spikes, means for guiding the back spikes and fins of the fish in a plane between said cutting planes, means for cutting the flesh from the belly of the fish along planes on opposite sides of the belly spikes, means for guiding the belly spikes and fins in a plane between the belly cutting planes, and means for removing the flesh from the ribs of the fish.

49. In a filleting machine of the type described the combination comprising means for advancing a fish tail first back down in the direction of its length, means for cutting the back of the fish near the base of the tail on opposite sides of the back spikes to the backbone, and means for engaging the backbone through said cuts to straighten and guide the backbone, said guiding means cooperating with said cutting means to disconnect the flesh at the back of the fish from the bony structure.

50. In a filleting machine of the type described the combination comprising means for advancing a fish tail first back down in the direction of its length, means for cutting the back of the fish near the base of the tail on opposite sides of the back spikes to the backbone, means for engaging the backbone through said cuts to straighten and guide the backbone, said guiding means cooperating with said cutting means to disconnect the flesh at the back of the fish from the bony structure, and means for removing the flesh from the belly spikes and ribs of the fish.

51. In a filleting machine of the type described the combination comprising means for advancing a fish tail first back down in the direction of its length, means for cutting the back of the fish near the base of the tail on opposite sides of the back spikes to the backbone, means for engaging the backbone through said cuts to straighten and guide the backbone, said guiding means cooperating with said cutting means to disconnect the flesh at the back of the fish from the bony structure, and means for holding the spikes and fins of the fish in the central longitudinal plane of the fish.

52. In a filleting machine of the type described the combination comprising means for advancing a fish tail first back down in the direction of its length, means for cutting the back of the fish near the base of the tail on opposite sides of the back spikes to the backbone, means for engaging the backbone through said cuts to straighten and guide the backbone, said guiding means cooperating with said cutting means to disconnect the flesh at the back of the fish from the bony structure, means for removing the flesh from the belly spikes and ribs of the fish, and means for holding the spikes and fins of the fish in the central longitudinal plane of the fish.

53. In a filleting machine the combination comprising means for advancing a fish in the direction of its length, means for cutting the flesh of the fish near the base of its tail at the back to the bone, means engaging the backbone of the fish through said cuts to guide it in its movement, and means for holding the fish against said guiding and cutting means, whereby continued movement of the fish severs the flesh from the back spikes.

54. In a filleting machine the combination comprising means for advancing a fish in the direction of its length, means for cutting the flesh of the fish near the base of its tail at the back to the bone, means engaging the backbone of the fish through said cuts to guide it in its movement, means for holding the fish against said cutting and guiding means whereby continued movement of the fish severs the flesh from the back spikes, means for severing the flesh from the belly spikes, and means for holding the fish in engagement with said belly flesh removing means.

55. In a filleting machine the combination comprising means for advancing a fish in the direction of its length, means for cutting the flesh of the fish near the base of its tail at the back to the bone, means engaging the backbone of the fish through said cuts to guide it in its movement, means for holding the fish against said cutting and guiding means whereby continued movement of the fish severs the flesh from the back spikes, means for severing the flesh from the belly spikes, means for holding the fish in engagement with said belly flesh removing means, and means for scraping the flesh from the ribs of the fish.

56. In a filleting machine the combination including means for advancing a fish in the direction of its length, means for slicing the flesh from the back of the fish in parallel planes closely adjacent to the back spikes, reciprocal means for engaging the backbone of the fish through the slicing cuts, said means guiding the fish in its movement by engagement with its backbone and cooperating with the slicing means to aid in removing the flesh, and means for slicing the flesh from the belly spikes in planes closely adjacent thereto, said reciprocal means aiding in feeding the fish to the belly slicing means.

57. In a filleting machine the combination including means for advancing a fish in the direction of its length, means for slicing the flesh from the back of the fish in parallel planes closely adjacent to the back spikes, reciprocal means for engaging the backbone of the fish through the slicing cuts, said means guiding the fish in its movement by engagement with its backbone and cooperating with the slicing means to aid in removing the flesh, means for slicing the flesh from the belly spikes in planes closely adjacent thereto, said reciprocal means aiding in feeding the fish to the belly slicing means, and means for scraping flesh from the ribs of the flesh while deflecting the flesh to the other side of the fish.

58. In a machine of the type described the combination comprising means for engaging a fish and conveying it in the direction of its length, means for slicing the flesh from the back of the fish, means for engaging the back bone of the fish to guide it as it moves, means for slicing the flesh from the belly of the fish, and means for moving said engaging means to advance the fish into the sphere of action of said belly slicing means.

59. In a machine of the type described the combination comprising a conveyor, means positioned adjacent the conveyor for slicing the flesh from the back of a fish along planes closely contiguous to the back spikes, means for engaging the back bone on the sliced side of the fish to guide it in its further movement, means for slicing the flesh from the belly side of the fish in planes closely contiguous to the belly spikes, and means operated by said conveyor means for moving said engaging and guiding means to present the fish to said belly slicing means.

60. In a filleting machine for filleting fish, the combination comprising a conveyor having gripping devices, means positioned to slice the fish along its back in planes closely contiguous to the back spikes, means for engaging the back bone of the fish to guide it in its further movement, means for slicing the flesh from the belly side of the fish in planes closely contiguous to the belly spikes, and means for releasing said gripping devices and thereafter moving said engaging and guiding means to advance the fish into the sphere of action of said belly slicing means.

61. In a filleting machine for filleting fish, the combination comprising a conveyor having gripping devices, means positioned to slice the fish along its back in planes closely contiguous to the back spikes, means for engaging the back bone of the fish to guide it in its further movement, means for slicing the flesh from the belly side of the fish in planes closely contiguous to the belly spikes, means for releasing said gripping devices and thereafter moving said engaging and guiding means to advance the fish into the sphere of action of said belly slicing means, and means for scraping the flesh from the ribs of the fish.

62. A filleting tool for a fish-dressing machine comprising a pair of spaced elongated blades positioned adjacent the surface of the machine upon which the fish rests, and means for supporting said blades in position in relation to said surface, each of said blades having a pointed forward extremity and a cutting edge which gradually recedes further from said surface as the cutting edge approaches the rear of said blade, said cutting edges also diverging away from each other towards the rear of said blades.

63. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a cutting edge which conforms to the shape of the sides of the prismatic bone so as to cut close to the sides of said bone.

64. A filleting tool for a fish-dressing machine comprising a pair of spaced elongated blades positioned adjacent the plane along which a fish is to be moved, and means for supporting said blades in position in relation to said plane, each of said blades having a cutting edge which gradually recedes further from said plane as the cutting edge approaches the rear of said blade, said cutting edges also diverging away from each other towards the rear of said blades.

65. A filleting tool for a fish-dressing machine comprising a pair of spaced elongated blades positioned adjacent the plane along which a fish is moved, and means for supporting said blades in position in relation to said plane, each of said blades having cutting edges diverging away from each other towards the rear of said blades.

WILLIAM H. HUNT.